(12) United States Patent
Brown

(10) Patent No.: US 10,143,192 B2
(45) Date of Patent: Dec. 4, 2018

(54) ANIMAL TRAP

(75) Inventor: Gordon Brown, Otley (GB)

(73) Assignee: Dasher Developments Ltd, Leeds (GB)

( * ) Notice: Subject to any disclaimer, the term of this patent is extended or adjusted under 35 U.S.C. 154(b) by 0 days.

(21) Appl. No.: 14/372,728

(22) PCT Filed: May 31, 2012

(86) PCT No.: PCT/GB2012/051223
§ 371 (c)(1),
(2), (4) Date: Feb. 4, 2015

(87) PCT Pub. No.: WO2013/107997
PCT Pub. Date: Jul. 25, 2013

(65) Prior Publication Data
US 2015/0157006 A1    Jun. 11, 2015

(30) Foreign Application Priority Data

Jan. 17, 2012 (GB) .................................. 1200719.1

(51) Int. Cl.
| | |
|---|---|
| A01M 23/30 | (2006.01) |
| A01M 23/12 | (2006.01) |
| A01M 31/00 | (2006.01) |
| G01L 19/12 | (2006.01) |
| G01V 8/10 | (2006.01) |

(52) U.S. Cl.
CPC .......... *A01M 23/12* (2013.01); *A01M 31/002* (2013.01); *G01L 19/12* (2013.01); *G01V 8/10* (2013.01)

(58) Field of Classification Search
USPC ....................................................... 43/77, 78
See application file for complete search history.

(56) References Cited

U.S. PATENT DOCUMENTS

| | | |
|---|---|---|
| 1,464,697 A | 8/1923 | Connolly |
| 2,445,166 A | 7/1948 | Crumrine |
| 3,109,308 A * | 11/1963 | Thompson ............. G01B 5/043 376/245 |
| 4,253,264 A | 3/1981 | Souza |
| 4,641,456 A | 2/1987 | Boharski |

(Continued)

FOREIGN PATENT DOCUMENTS

| | | |
|---|---|---|
| JP | 2007037437 A | 2/2007 |
| WO | 2009/066095 A1 | 5/2009 |

OTHER PUBLICATIONS

International Search Report in PCT/GB2012/051223 (current application), dated Apr. 10, 2012
(Continued)

*Primary Examiner* — Joanne Silbermann
(74) *Attorney, Agent, or Firm* — Birch Tree IP Law & Strategy PLLC; Jamie T. Gallagher

(57) ABSTRACT

An animal trap comprising a trap (106, 102, 302) section having at least one moveable wall section (136, 228, 314), being moveable with respect to one or more other walls of the trap section to thereby alter the size of the trap section; animal detection means (138, 242, 306) operable to detect the presence of an animal within the trap section and adapted to signal such a presence to control means, which control means is operable, upon receipt of said signal, to cause movement of the moveable wall section (136, 228, 314) and thus alter the size of the trap section.

18 Claims, 6 Drawing Sheets

(56) References Cited

U.S. PATENT DOCUMENTS

| | | | | |
|---|---|---|---|---|
| 2003/0213161 A1* | 11/2003 | Gardner, Jr. | ............ | A01M 1/026 43/61 |
| 2006/0001014 A1* | 1/2006 | Peters | ................ | A47G 27/0493 254/201 |
| 2009/0205244 A1* | 8/2009 | Pomerantz | ............ | A01M 23/18 43/61 |
| 2014/0283435 A1* | 9/2014 | Galeb | ................. | A01M 23/005 43/107 |

OTHER PUBLICATIONS

Written Opinion in PCT/GB2012/051223 (current application).
2012800715393.5, CN, Nov. 17, 2015, Chinese Office Action (English Translation).

\* cited by examiner

ANIMAL TRAP

The present invention relates to animal traps, particularly to rodent traps, such as traps suitable for trapping rats and mice.

It is a known fact that some animals are pests under certain circumstances. A particular order of animal that is often regarded as a pest is Rodentia (rodents). Rodents, particularly mice and rats, can represent a large problem by causing damage to property and seed/grain stores. Many rodents are also known to carry and spread disease.

Many systems and devices are known to control the population of rodents. For example, poisons may be administered to be ingested by the rodent, the rodent subsequently being left to slowly die. Alternatively, mechanical systems, such as a conventional mouse trap are known to trap and usually kill rodents quite quickly.

Many of the existing systems and devices however have known associated problems. For example, many known systems are un-necessarily cruel and may cause the rodent excessive pain and suffering. Mechanical systems, such as a conventional mouse trap may cause less suffering because death of the rodent is usually instantaneous, but can only be used once before being reset. Additionally, many known systems and devices may pose a threat to other non target animals, such as cats and dogs or even pose a risk to small children.

It is an object of aspects of the present invention to provide one or more solutions to the above mentioned or other problems.

According to a first aspect of the present invention there is provided an animal trap comprising a trap section having at least one moveable wall section, being moveable with respect to one or more other walls of the trap section to thereby alter the size of the trap section; animal detection means operable to detect the presence of an animal within the trap section and adapted to signal such a presence to control means, which control means is operable, upon receipt of said signal, to cause movement of the moveable wall section and thus alter the size of the trap section.

Preferably, the animal trap is a rodent trap, such as a rat trap or a mouse trap. The animal trap may be a Sciuridae trap, for instance a squirrel trap.

Preferably, the animal detection means comprises pressure sensing means, which are preferably situated on at least a portion of a floor of the trap section. Preferably, the pressure sensing means is operable to signal to the control means when an animal stands thereon.

Optionally, the animal detection means may comprise a beam of light, which is preferably cast across at least a portion of the trap section. Preferably the beam of light is a laser beam. Preferably when said beam of light is broken by an animal a signal is sent to the control means.

Preferably, the control means comprises an electronic circuit. Preferably, the animal detection means is operable, upon detection of an animal, to complete the electronic circuit. In a particularly preferred embodiment, the animal detection means comprises pressure sensing means operable to complete an electronic circuit of the control means upon sensing a pressure thereon.

Optionally, the control means may further comprise a notification system. Preferably the notification system is operable to notify a user of the activation of the animal detection means. Preferably the notification system is operable to notify a user remotely of said activation. More preferably the notification system is operable to notify a user remotely by use of a wireless transmission to a remote receiving device. Such receiving devices include but are not limited to; a PC, mobile phone, tablet, laptop, pager, or other computer device. Advantageously, when the user is notified remotely they are aware that the animal trap has been activated, and are reminded to check the trap for any animals. Furthermore, it may enable a user to keep track of how many animals are being trapped and when the animal trap needs emptying.

Preferably, the animal trap comprises trapped animal storing means. The trapped animal storing means may be removable from the animal trap. The trapped animal storing means may be operable to store a plurality of trapped animals, in use. For example, the trapped animal storing means may be operable to store 3, 4, 5, 8, 10 or more trapped animals.

Optionally, the trapped animal storing means may comprise a drawer, which may be removable from the animal trap. Preferably, such a drawer is slidably removable from the animal trap. Advantageously such a drawer allows the trapped animals to be removed from the animal trap without disturbing the animal trap itself. Furthermore, the animal trap may be provided with a plurality of drawers such that a first drawer may be removed from the animal trap and emptied whilst a second drawer is fitted to the animal trap to avoid any loss in functionality of the animal trap.

Advantageously, the trapped animal storing means allows the trap to store more than one trapped animal, thus the trap does not require to be reset after each use by human intervention. Also, there is no requirement to re-bait the animal trap, because the bait is situated in an area that is not accessible to the animal.

Preferably, the trap section comprises an impact surface, which is preferably situated generally opposite the at least one moveable wall section.

The impact surface may be situated on or adjacent an impact wall. The impact wall may comprise an aperture therethrough. The aperture may open into the trapped animal storing means.

The impact surface may comprise a flap, preferably arranged over the aperture of the impact wall.

The impact surface may be arranged to be moveable with regard to the impact wall. The impact surface may be hingeably connected to the impact wall.

The impact surface is preferably arranged relative to the impact wall so as to allow trapped animals to be moved from the trap section to the animal storage means, preferably through the aperture in the impact wall.

The impact surface may be arranged to prevent access from the animal storing means to the trap section.

The impact surface may be arranged with regard to the impact wall to provide a one way door to allow animals into the animal storing means from the trap section via the aperture in the impact wall, but preferably to prevent access from the animal storing means to the trap section.

In one embodiment, the floor of the trap section may comprise an aperture which may allow access from the trap section into the trapped animal storing means.

Preferably, the at least one moveable wall section is operable to push an animal onto the impact surface, in use.

In use, the at least one movable wall may be operable to move toward the impact surface and may be operable to remain in such a position for a predetermined period of time. For example, in use, the at least one movable wall may be operable to move toward the impact surface and may be operable to remain in such a position for at least 5 seconds, preferably at least 10 seconds and more preferably at least 20 seconds. In one embodiment, in use, the at least one movable wall may be operable to move toward the impact surface and may be operable to remain in such a position for at least 30 seconds.

In this manner, the animal may be trapped in position for a predetermined extended period of time to thereby increase the likelihood of fatality of the animal.

The at least one movable wall may have a corrugated portion, preferably on at least a portion thereof which is operable to contact the animal, in use.

The device may comprise a counter to count the number of times the trap has been sprung.

Preferably, the trap section comprises a door to allow an animal access thereinto. Preferably, the door is a suitable shape/size for the animal to be trapped.

In some embodiments, the trap section may be arranged generally vertically, such that an animal, for example a squirrel, may climb up into the trap section.

Preferably, the at least one moveable wall section is moveable by virtue of an electricity supply, which may comprise a battery.

Preferably, the at least one moveable wall section is connected to a rod, which rod is preferably connected to a face of a flywheel. Preferably, the rod is connected off centre to a face of the flywheel.

Preferably, the at least one moveable wall section is connected to a rod, which rod is preferably connected to a face of a flywheel such that rotational of the flywheel courses reciprocal movement of the at least one moveable wall section.

The animal trap may contain a motor, which may be operable to cause movement of the at least one moveable wall section.

The motor may be operable to cause rotation of the flywheel.

Detection of an animal via the animal detection means may cause rotation of the flywheel.

In an alternative embodiment, the at least one movable wall section may be moveable by compressed air. In such an embodiment the trap may comprise or be adapted to be attached to a supply of compressed air. Preferably the supply of compressed air is contained within the animal trap.

The animal trap may further comprise a single stroke air cylinder. Preferably the single stroke air cylinder is powered by the supply of compressed air.

The animal trap may further comprise an air powered ram. Preferably the air powered ram is adapted to be powered by the single stroke air cylinder. Preferably, upon detection of an animal via the animal detection means, the at least one movable wall is caused to move by the air powered ram.

Optionally, the animal trap may further comprise a pressure gauge. Preferably the pressure gauge is operable to detect the pressure of the compressed air supply. Advantageously, the pressure gauge can be checked to avoid over pressurising the system which could cause a dangerous rupture within the system or an air leak.

Optionally, the animal trap may further comprise a control valve. Preferably the control valve is operable to deactivate or shut the system down. More preferably the control valve is operable to shut the system down when the pressure of the compressed air supply falls below a set limit. Preferably the set limit is the minimal compressed air pressure necessary to power the single stroke air cylinder such that the air powered ram will move the movable wall with enough force to instantly terminate the animal. More preferably the set limit is adjustable by the user such that the trap can be tailored to the animal infestation which needs to be removed. For example a higher pressure may be needed for larger rodents such as rats, but a lower pressure needed for smaller rodents such as mice. Preferably the set limit for the minimal compressed air pressure is at least 3 bar. More preferably, the compressed air pressure stays at an optimal level of between 7 and 10 bar.

Preferably the pressure gauge and the control valve are operable to communicate with each other. More preferably, the pressure gauge may detect the pressure of the compressed air supply and communicate this information to the control valve which then processes the information. Preferably the control valve processes the information by comparing the pressure communicated by the pressure gauge to the set limit and determining an action. If the pressure is below the set limit, preferably the control valve shuts down the system. Preferably, the control valve shuts down the system by withholding the release of compressed air from the compressed air supply. If the pressure is above the set limit, preferably the control valve allows the supply of compressed air to proceed to the single stroke air cylinder.

Preferably therefore, upon detection of an animal via the animal detection means, the pressure gauge and the control valve communicate before the at least one movable wall is caused to move by the air powered ram.

Optionally, the animal trap may further comprise a warning system operable by the control valve when the system has been shut down. The warning system may comprise a light, audible alarm or remote electronic notification to communicate to the user that the air pressure is too low. Accordingly, the user is then notified to change the compressed air supply.

Advantageously, the control valve allows the animal trap to detect when the compressed air pressure is too low to operate the system such that the animal is killed instantly. It also allows the system to be tailored to the animal that needs to be removed. This avoids any animals within the trap experiencing unnecessary pain and suffering, and allows the animal trap to be as humane as possible. Furthermore, the control valve eliminates the chance of any animal being alive when the animal trap is emptied which could cause harm to the user.

The animal trap may further comprise a retracting spring. Preferably the retracting spring is operable to retract the movable wall section after a stroke has been implemented. Preferably therefore the retracting spring is attached at a first end to the movable wall section and at a second end to the walls of the animal trap. When a stroke is implemented, the movable wall section moves towards the impact section and extends the retracting spring, after the stroke is fully implemented the retracting spring then retracts and pulls the movable wall section back to its starting position.

The term 'retracting spring' as used above and hereafter is meant to encompass any spring which may passively recoil to retract the movable wall section after a stroke. It does not by any means encompass the use of a spring for any other purpose within the animal trap, it especially does not include the use of a spring for the mechanism of terminating of any animal.

In an alternative embodiment, the retracting spring may be positioned within the single stroke air cylinder. Preferably in such cases, the retracting spring is attached at a first end to the air powered ram and at a second end to the cylinder itself.

Optionally, the animal trap may further comprise a safety switch. The safety switch is operable to shut down the device when triggered by the user. The switch may be triggered by direct contact or remotely. Preferably the safety switch is located at a back wall of the animal trap such that it is unlikely to be triggered accidentally. Advantageously, the safety switch allows a user to control the activity of the animal trap even remotely, and may allow a user to respond to a warning notification from the control valve without visiting the site of the trap.

According to a further aspect of the present invention there is provided a method of trapping animals, the method comprising detecting the presence of an animal in a trap section of an animal trap using animal detection means; said animal detection means signalling the presence of an animal to control means, said control means causing movement of a moveable wall section of the trap section to thereby alter the size of the trap section.

All of the features contained herein may be combined with any of the above aspects in any combination.

For a better understanding of the invention, and to show how embodiments of the same may be carried into effect, reference will now be made, by way of example, to the accompanying diagrammatic drawings in which.

Figure 1:
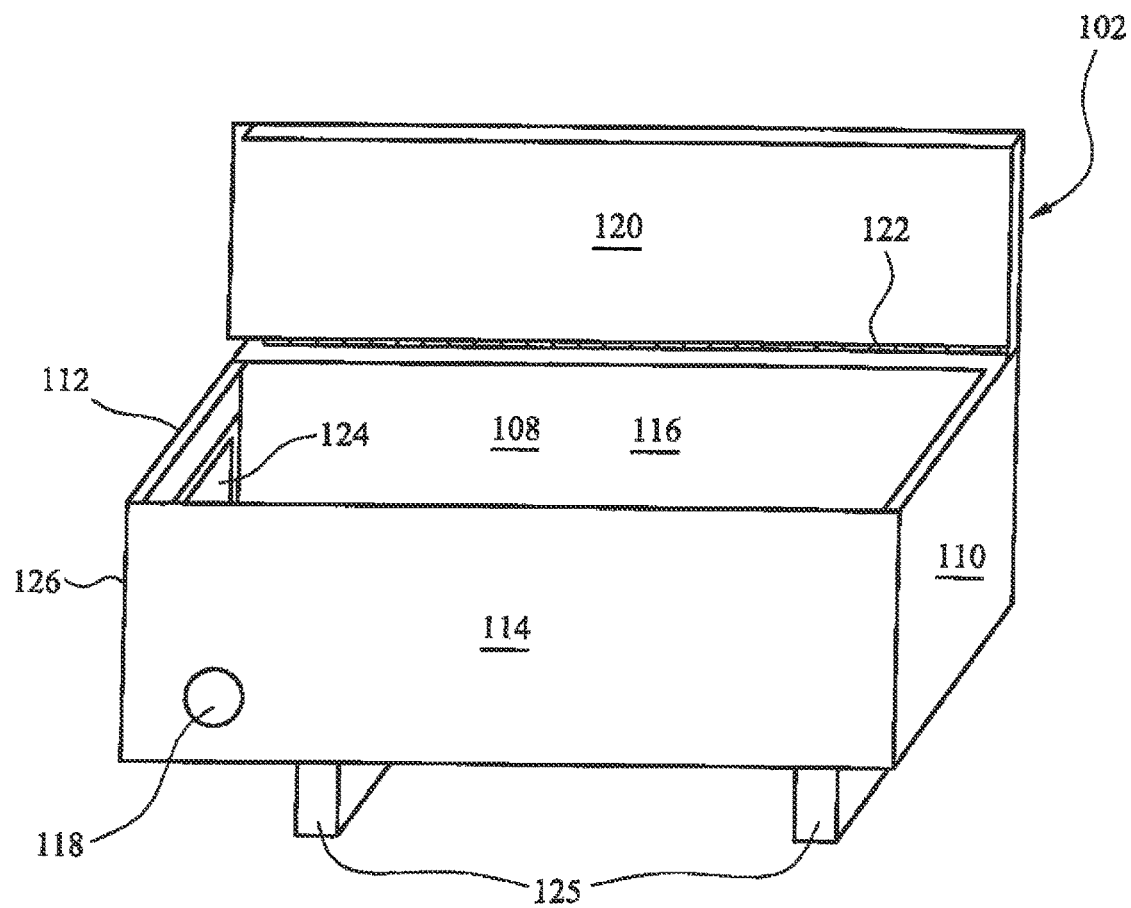
FIG. 1 shows a perspective view of a first part of a rodent trap.

Referring first to FIG. 1 there is shown a first part 102 of a rodent trap 106. The first part 102 comprises a cuboidal box 108 having opposing short walls 110, 112 and opposing long walls 114, 116. On a first of the long walls 114, toward a lower corner thereof, is a circular hole 118, which extends through the wall into an interior of the box 108. Extending from an upper edge of the opposite long wall 116 is a lid 120. The lid 120 is connected to the wall 116 by a hinge 122 and is shown in FIG. 1 in an open configuration.

On a second of the short walls 112 is an aperture 124, covered by a flap 126. The flap 126 is fixed on an exterior of the box 108 and is slightly larger than the aperture 124. The flap 126 is hinged to the side wall 112 above an upper edge of the aperture 124. The aperture 124 and flap 126 will be discussed in more detail hereunder.

A base of the box 108 has legs 125 extending therefrom, such that the box is lifted slightly off a surface upon which it stands.

Figure 2:
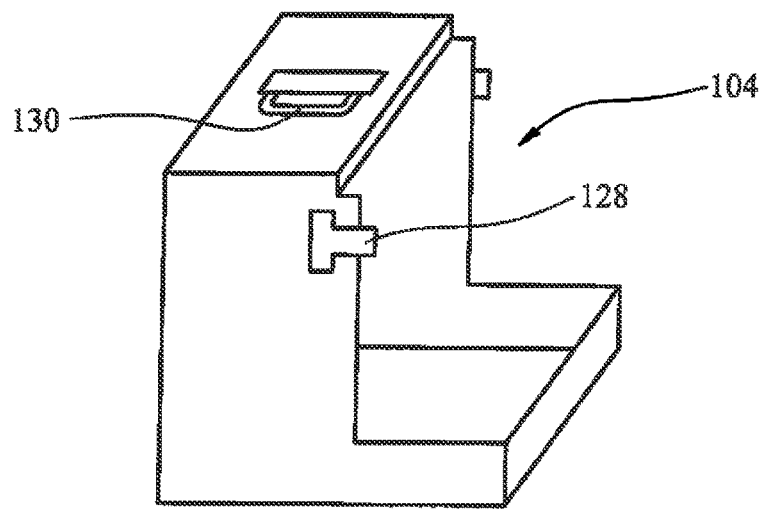
FIG. 2 shows a perspective view of a second part of a rodent trap.

Referring now to FIG. 2 there is shown a second part 104 of the rodent trap 106. The second part 104 comprises a cuboidal box having a large portion thereof cutaway to leave a partially enclosed collection box. Toward a top of the cutaway section of the second part 104 are clips 128 that allow the second part 104 to be secured to the first part 102 as will be described hereunder. On an upper surface of the second section is a handle 130. The cutaway potion is shaped such to correspond with and fit around the first part, as is shown in FIG. 3.

Figure 3:
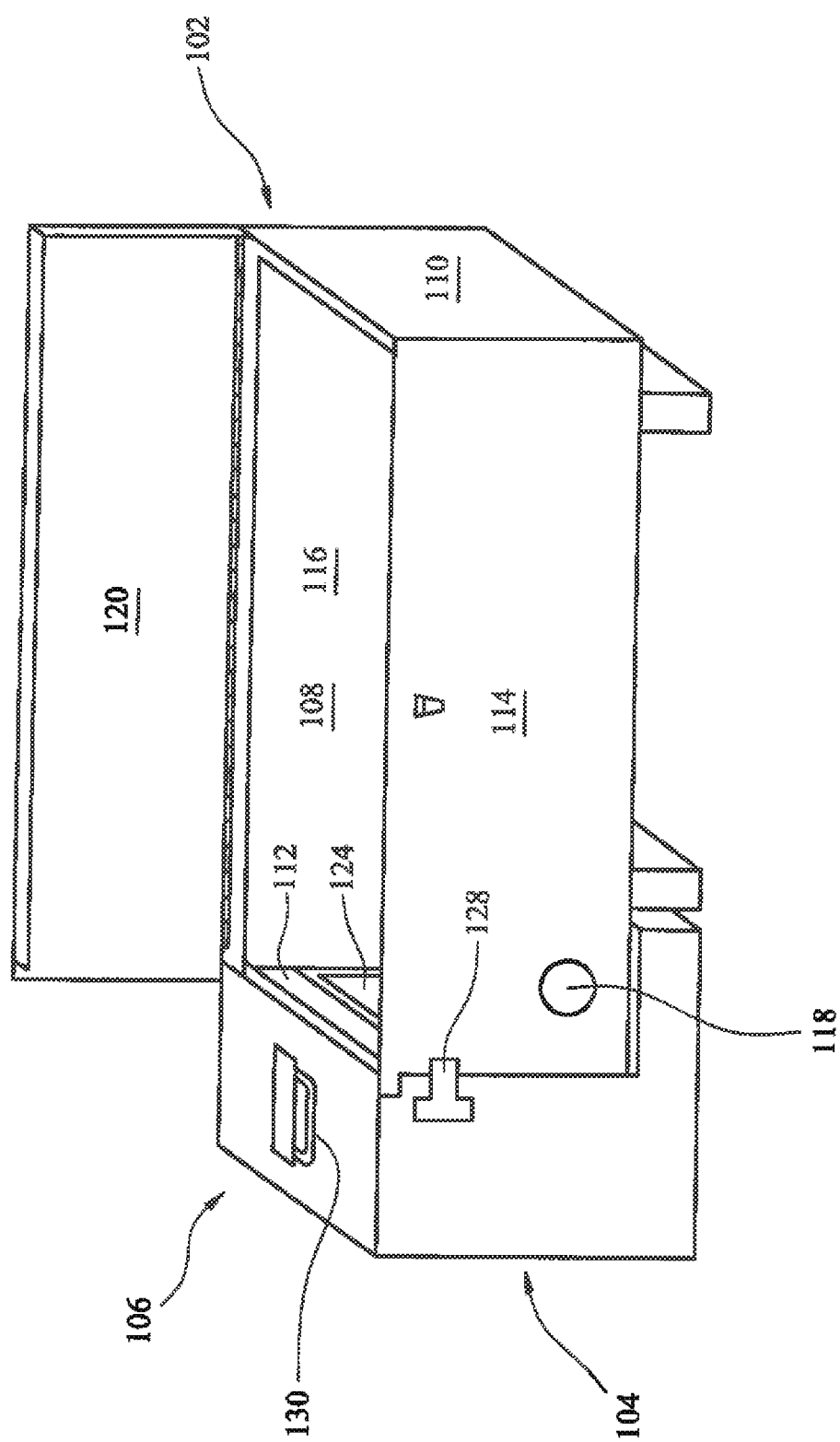
FIG. 3 shows a perspective view of the first and second part of the rodent trap assembled together.

Referring now to FIG. 3, there is shown the first section 102 and the second section 104 joined together to form the rodent trap 106. As discussed above with regard to FIG. 2, the second part accommodates and fits around the first part. Specifically, the second part fits over the second of the short walls 112 and extends around and under a portion of a base of the box 108.

Figure 4:
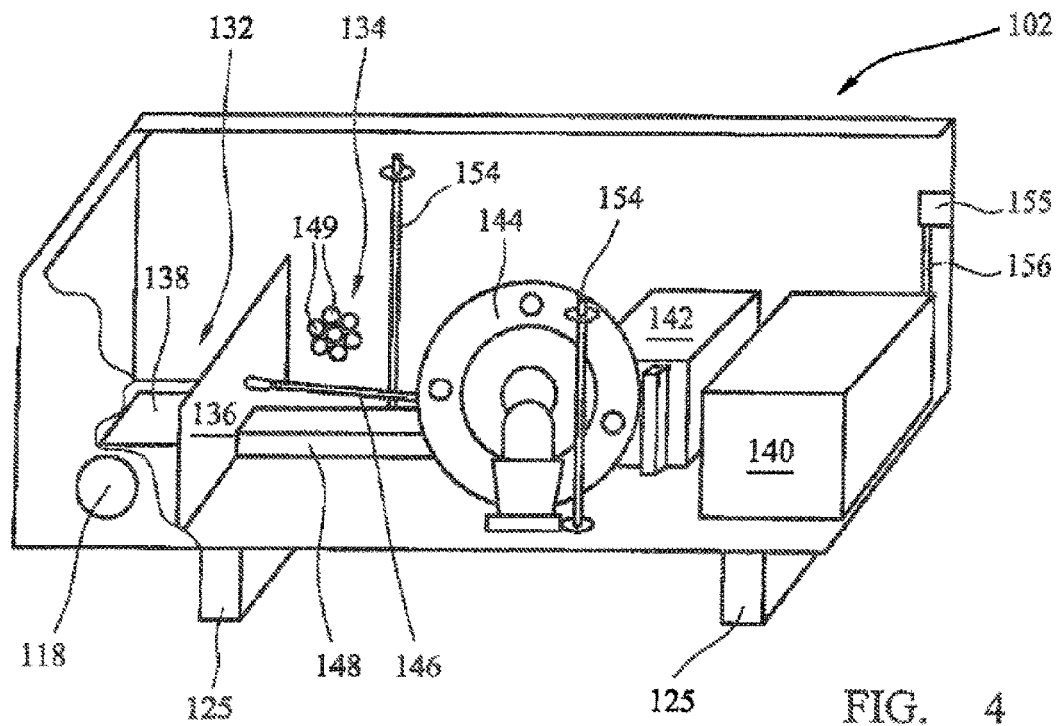
FIG. 4 shows a perspective partial cutaway view of the first part of the rodent trap.

Referring now to FIG. 4 there is shown a partial cutaway view of the first part 102, having most of the long wall 114 removed, and the short wall 110 removed.

Inside the box 108 are two areas 132, 134, separated by a wall 136. The first area 132 is accessible via the hole 118 in the long wall 114 and comprises a pressure sensitive section 138 on a floor thereof. The second area 134 comprises electrical and mechanical components to operate the trap 106.

In more detail, the second area 134 comprises a battery 140, such as a 12 volt car battery, connected to a motor 142, such as a car starter motor. The motor is connected to a circular flywheel 144, which is mounted vertically on an axel and is free to rotate when caused to do so by the motor 142. The flywheel 144 has a rod 146 connected, off centre, to a face thereof, such that when the flywheel 144 rotates, the rod 146 moves in a reciprocating manner.

The rod 146 is connected to the wall 136. The wall 136 is arranged on a runner 148, to allow it to move in a reciprocal manner. The second area 134 also has a vent 149 in the wall 116 and a safety switch 155. The safety switch 155 is operable to shut down the motor 140 either manually or remotely via the electrical connection 156.

Figure 5:
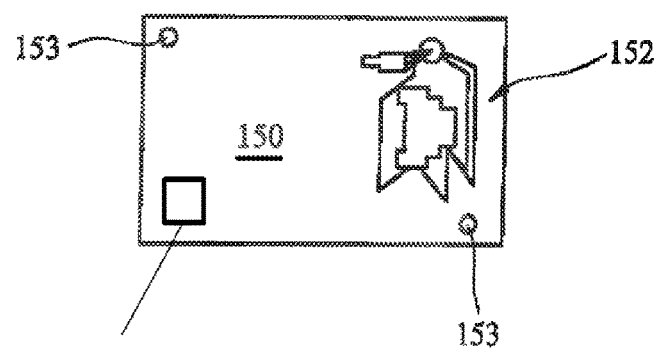
FIG. 5 shows a control plate of the rodent trap.

FIG. 5 shows a plate 150, having electrical circuitry 152 thereon (a relay, etc.), to control the action of the rodent trap 106. The plate 150 locates via apertures 153 onto upstanding rods 154 in the box 108. A notification system 402 is included and is operable to notify a user of the activation of animal detection.

Figure 6:
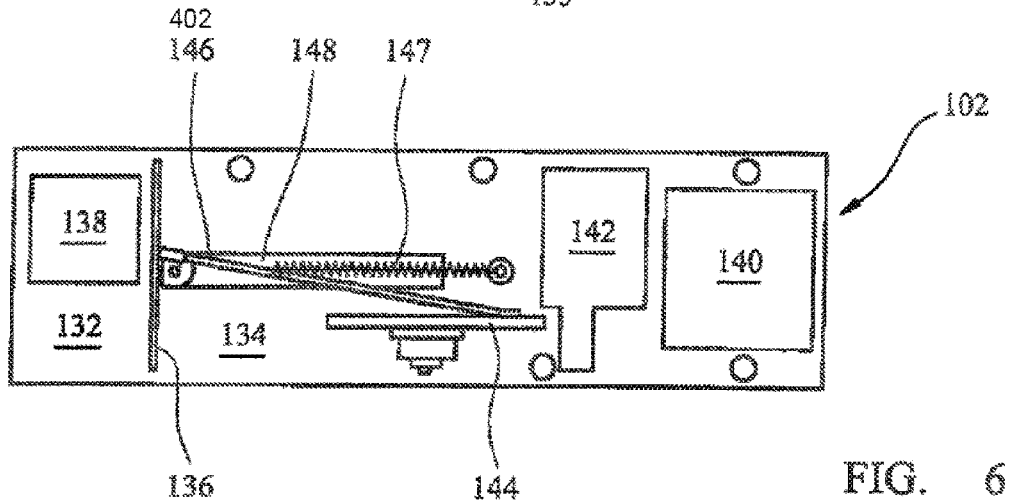
FIG. 6 shows a plan view of the first part of the rodent trap.

FIG. 6 shows a plan view of the interior of the box 108 and is labelled the same as FIG. 4. Now visible, is retracting spring 147 connected at a first end to the base of the first area 132 of the box 108 and at a second end to the rod 136. The retracting spring 147 allows the wall 136 to be retracted after the rod 136 has implemented a stroke.

In use, the rodent trap 106 operates as follows. Food (not shown) is placed in the second area 134 and air enters through the vent 149, over the food (not shown) thus the smell of the food will be carried around the trap 106 to attract rodents thereto.

A rodent enters the trap 106 via the hole 118. The hole is of an appropriate size for the target rodent, such as a rat or mouse. Thus, the rodent enters the box into the first area 132 and walks onto the pressure sensitive pad 138. This completes an electrical circuit, thus triggering a relay and causing the motor to operate and the flywheel to rotate, which moves the wall quickly toward the rodent and crushes it against the flap 126. The rodent dies almost instantaneously. The electrical circuit, after triggering, takes a few seconds to reset, in which time, the wheel rotates, a couple of times, more slowly, before coming to a rest. In these further rotations, the rodent is pushed through the flap 126, into the second section 104. After which, the retracting spring 147 retracts and pulls the wall 136 back along the runner 148 to its starting position.

The second section may then be removed and emptied when a multitude of rodents have been caught.

Figure 7:
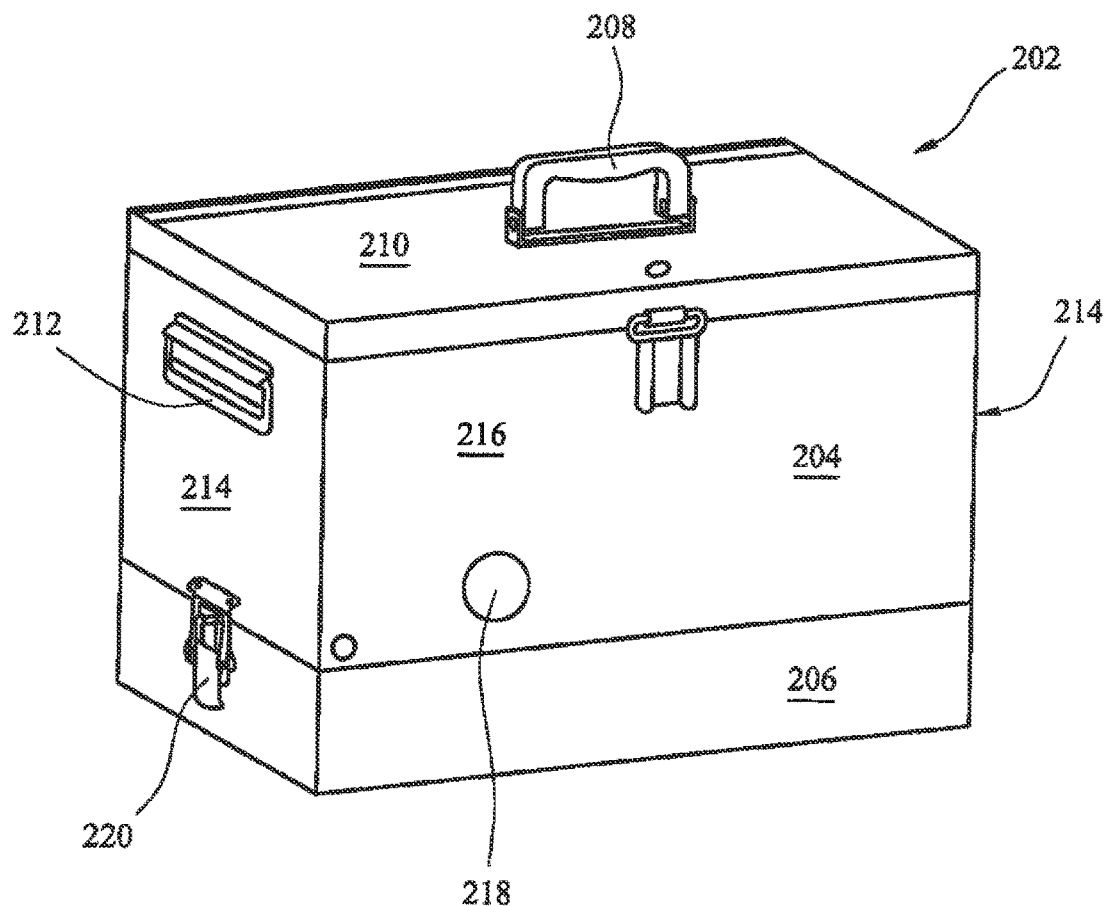
FIG. 7 shows a perspective view of a second embodiment of a rodent trap.

Referring now to FIGS. 7 to 10 there is shown a second embodiment of a rodent trap 202. Referring to FIG. 7, the rodent trap 202 comprises a box 204 sat atop a tray 206. The box 204 comprises a handle 208 on a top surface thereof 210 and side handles 212 on side surfaces thereof 214. Toward a lower corner of a front face 216 of the box 204 is an aperture 218 through which a rodent can enter the box 204

The box 204 sits atop a tray 206, the two being held together by clips 220.

Figure 8:
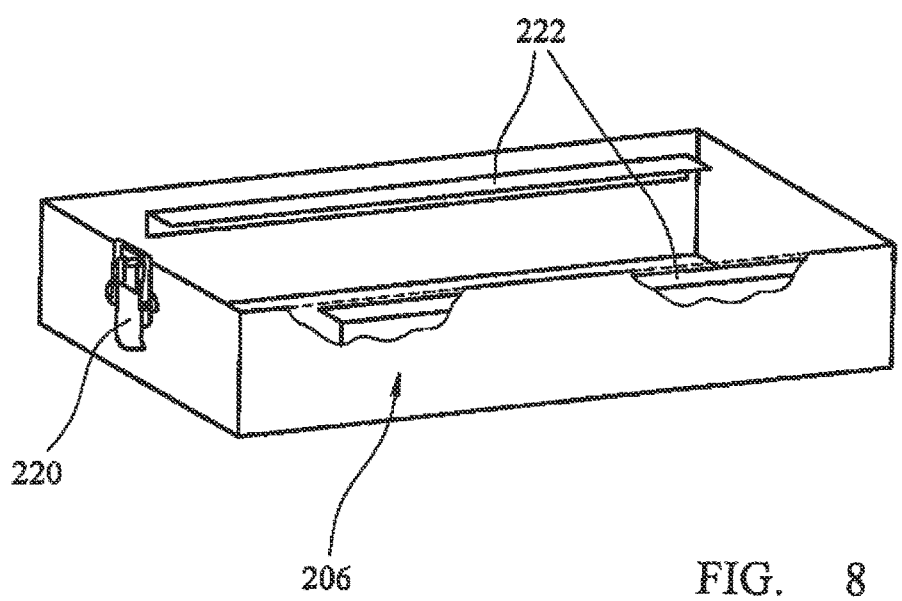
FIG. 8 shows a perspective view of a bottom section of a second embodiment of a rodent trap.

Referring to FIG. 8 there is shown the tray 206 detached from the box 204. Support brackets 222 can be seen inside the tray 206 upon which the box 204 is supported, in use.

Optionally, the box 204 may sit atop a drawer (not shown), similar to tray 206, but contained within a casing (not shown) continuous with box 204. In such cases (not shown), the trap 202 is a single unit and the drawer sits within a casing in the lower portion of the box 204. The drawer can then be slidably removed from the trap 202 to be emptied. As such, the drawer may be held in place by the casing without the need for clips.

Figure 9:
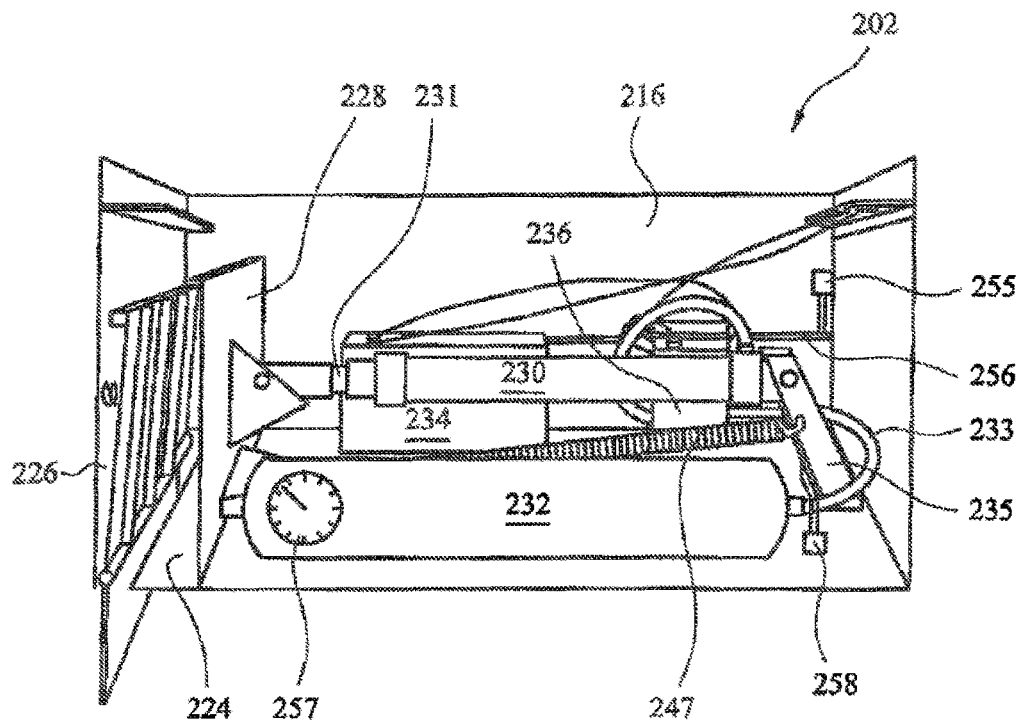
FIG. 9 shows a perspective view inside a second embodiment of a rodent trap.
Figure 10:
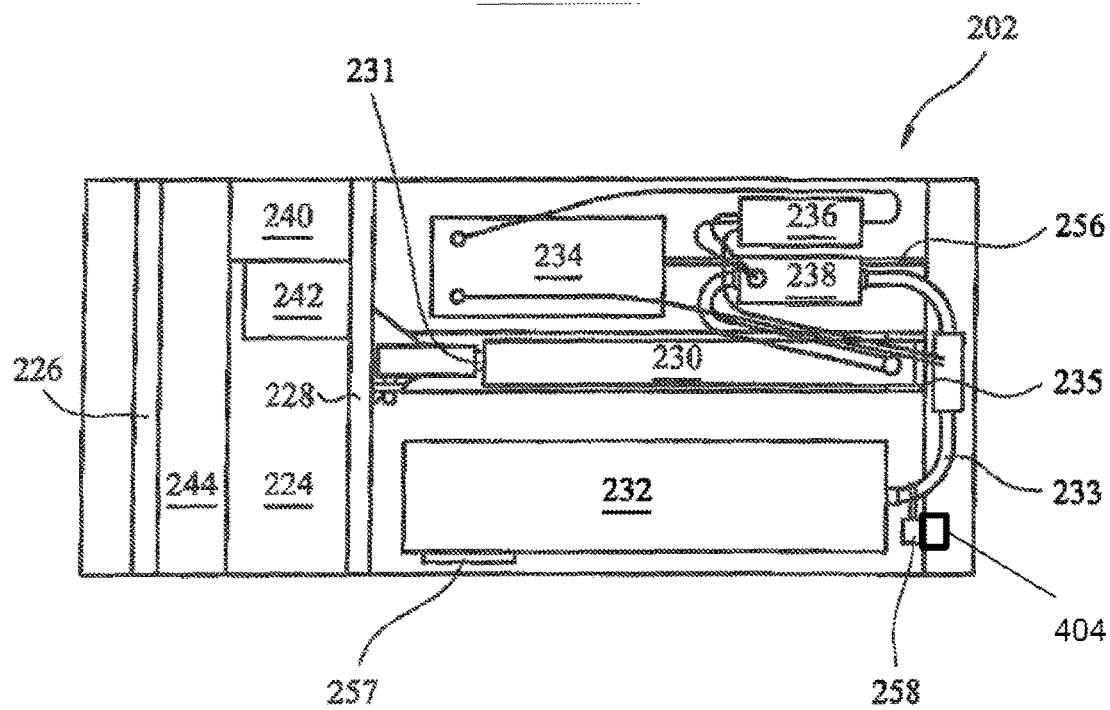
FIG. 10 shows a plan view inside a second embodiment of a rodent trap.

Referring now to FIGS. 9 and 10 there is shown an interior of the box 204. The interior comprises a trap compartment 224 having a static wall 226 opposite a moveable wall 228. The moveable wall 228 is attached to an air powered ram 231 housed within a single stroke air cylinder 230 which is in turn attached to a compressed gas supply 232 via an air line 233, an air valve 238 and a control valve 258. The control valve 258 shuts the system down by withholding air release from the supply 232 when it is detected that the pressure of the air in the supply 232 is below a set limit necessary to terminate the animal in the trap 202.

A retracting spring 247 is connected at a first end to the support 235 of the single stroke air cylinder 230 and at a second end to the wall 228. The retracting spring 247 allows the wall 228 to be retracted after the ram 231 has implemented a stroke.

The interior of the box 204 also comprises a battery 234 connected to a timer relay 236 and a pressure gauge 257 positioned upon the compressed gas supply 232 allowing pressure within the tank of the supply to be read from the dial. A safety switch 255 is further positioned upon the wall 216 and connected via connection 256 to the battery 234. The safety switch 255 is operable to shut down the battery 234 either manually or remotely via the electrical connection 256 when triggered by the user.

Optionally, the pressure gauge 257 may be connected to the control valve 258 by means of a connection (not shown) in order to allow the pressure gauge 257 to relay information about the pressure of the air within the compressed air supply to the control valve 258 before air is released via air line 233 to implement a stroke of the air cylinder 230. A warning system 404 is operable by control valve 258 when a trap has been deactivated.

Optionally, the retracting spring 247 may be housed within the single stroke air cylinder, instead of separately as shown. In which case, a first end of the retracting spring 247 is connected to the air powered ram 231 and a second end of the retracting spring 247 is connected to the cylinder 230 itself.

The second embodiment of a rodent trap 202 functions in a similar manner to the first embodiment as follows. A rodent enters the trap compartment 224 via aperture 218 and is attracted to food on tray 240. Upon placing pressure on pressure sensitive pad 242 (by standing on it), the rodent triggers a circuit. The circuit causes the compressed air supply 232 to release pressurised air through the control valve 258 (if it is of high enough pressure) through air line 233, via air valve 238 and into the single stroke air cylinder 230. The single stroke air cylinder becomes pressurised behind the ram 231 within the cylinder 230 until the air powered ram 231 is forced out of the cylinder 230. The ram 230 then pushes the attached moveable wall 228 to move toward the static wall 226 at speed, crushing the trapped animal and killing it instantaneously against the wall 226, thus causing the animal to fall through hole in floor 244 and into the tray 206, which acts as trapped animal storage means and can store a plurality of animals. In this manner, animals are trapped.

Squirrels are, in certain circumstances, a prolific pest and their population needs controlling.

Figure 11:
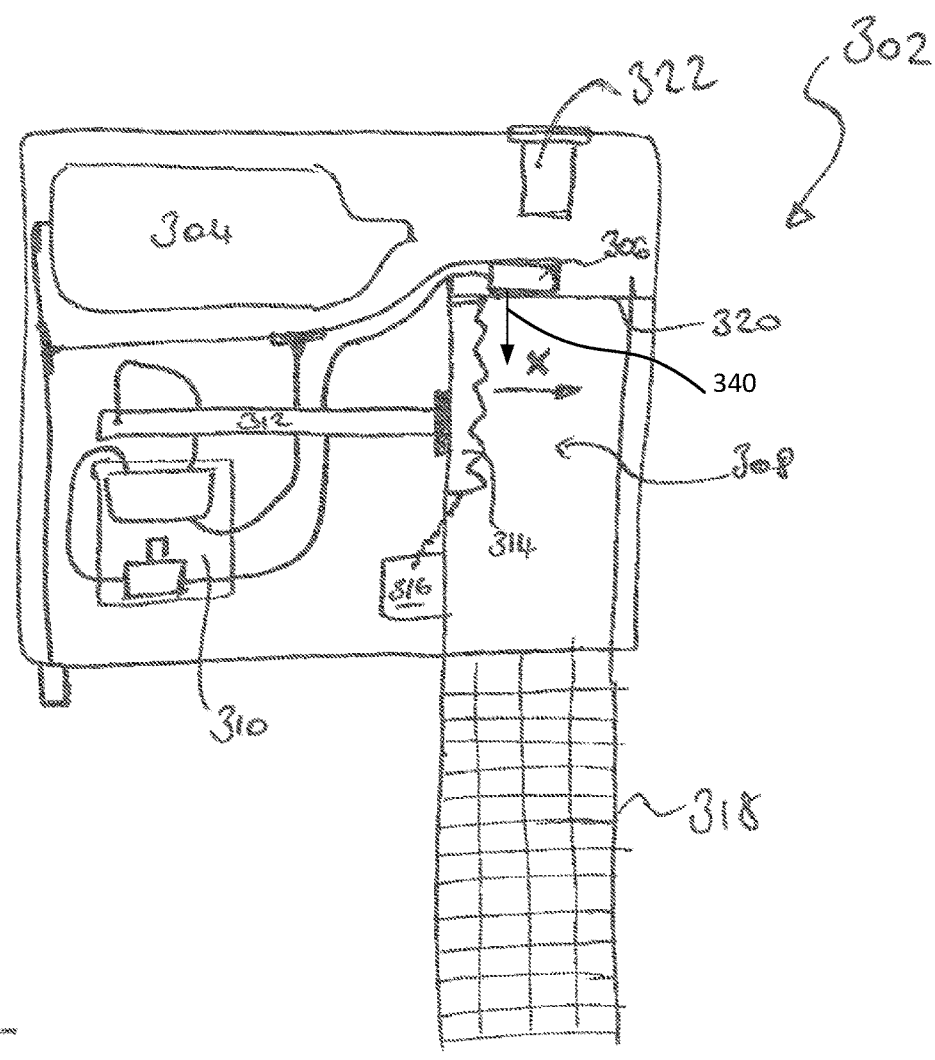
FIG. 11 shows a further embodiment of an animal trap suitable for use with squirrels.

Accordingly, referring now to FIG. 11 there is shown a further embodiment of the animal trap 302 being suitable for controlling squirrels.

The trap 302 is in many ways similar to the trap 202 described above. For example, it comprises a compressed gas storage cylinder 304, detection means 306 operable to detect the presence of a squirrel (not shown) in a trap area 308, the detection means being operable to send a signal to a switch 310, which activates a ram 312, thereby firing a moveable wall 314 across the trap area as indicated by direction arrow "X" to contact the other side of the trap area and thereby trap a squirrel. Optionally, a detection means (e.g., detection means 306) of an animal trap according to the current disclosure, may include a beam of light (example shown in FIG. 11 as light beam 340), which may be cast across at least a portion of a trap section, such as shown in FIG. 11 as trap area 308.

The firing plate 314 is attached to a counter 316 which is operable to count the number of times the trap has been sprung. The trap 302 further comprises a mesh tunnel 318 which extends downward from the trap area 308. At a top of the trap area is a grate 320 upon which bait can be placed (via access aperture 322).

The trap 302 is operable in use to be placed in elevated positions, such as in trees or the like and is positioned such that the trap area is arranged vertically, with the firing plate at or toward an upper region thereof.

In use, a squirrel, detecting the bait placed on the grate 320 climbs up the tunnel 318 into the trap area 308. Once in the trap area, the squirrel is then detected by the detector 306 and the firing plate then activated to fire across the trap area 308 and contact the squirrel. The firing plate remains in this position for some time (30 seconds), before releasing pressure and resetting. In releasing the pressure, the now dead squirrel is released and falls out of the trap 302. For this reason, it is not necessary for the trap 302 to have a collecting tray (as per the first and second embodiment). However, the counter 316 is operable to inform a user of the number of times the trap has fired and therefore the number of squirrels trapped.

An animal trap made in accordance with the present invention has the advantage that the death of the target animal is very quick and thus unnecessary cruelty is avoided. Furthermore the control valve allows the activity of the trap to be moderated, and acts as a failsafe to stop any animal being at risk of painful injury without death. Additionally, the safety switch allows the user to gain remote control of the trap at any time. Also, the trap can catch many animals without the need to be reset. Further, the caught animals are stored in a removable section or drawer, thus the trap is easy to empty.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of trapping animals, the method comprising:
   detecting the presence of an animal in a trap section of an animal trap, the trap section having at least one moveable wall section, the at least one moveable wall section being moveable with respect to one or more other walls of the trap section to thereby alter the size of the trap section, the animal detection means being operable to detect the presence of an animal within the trap section and adapted to signal such a presence to a control means, which control means is operable, upon receipt of said signal, to cause movement of the at least one moveable wall section and thus alter the size of the trap section, wherein the at least one moveable wall section is moveable by compressed air such as to push the moveable wall toward an opposed other wall at speed, crushing a trapped animal and killing it against the opposed wall, and wherein the animal detection means comprises a beam of light, which is cast across at least a portion of the trap section;
   detecting a pressure of the compressed air of the animal trap;
   determining if the pressure is below a limit that is a preset minimal pressure needed to move the at least one moveable wall section with enough force to terminate the animal; and
   if the pressure is below the limit, deactivating the animal trap, if the pressure is not below the limit, causing movement of the at least one moveable wall section in response to the control means receiving said signal, the movement of the at least one moveable wall section altering the size of the trap section and crushing the trapped animal.

2. A method according to claim 1, further comprising notifying a user of the animal trap of the detecting the presence of an animal.

3. A method according to claim 1, wherein the animal trap further comprises a collection section that is removable from the animal trap and the method further comprises collecting the crushed trapped animal via the collection section.

4. A method according to claim 1, wherein the trap section is arranged generally vertically when the animal trap is in use and the trap section is configured such that the animal can climb up into the trap section.

5. A method according to claim 1, wherein the causing movement of the at least one moveable wall includes use of a supply of compressed air.

6. A method according to claim 5, wherein the supply of compressed air includes a single stroke air cylinder.

7. A method according to claim 1, wherein the causing movement of the at least one moveable wall includes use of an air powered ram.

8. A method according to claim 7, wherein the causing movement of the at least one moveable wall includes use of a supply of compressed air.

9. A method according to claim 8, wherein the supply of compressed air includes a single stroke air cylinder and wherein the air powered ram is configured to be powered by the single stroke air cylinder.

10. A method according to claim 7, the causing movement of the at least one movable wall includes the movable wall being moved by the air powered ram.

11. A method according to claim 1, wherein the preset minimal pressure is at least 3 bar.

12. A method according to claim 1, wherein the animal trap further comprises a warning system operable by the control means when the trap has been deactivated.

13. A method according to claim 1, further comprising notifying a user of the animal trap if the animal trap is deactivated.

14. A method according to claim 1, further comprising retracting the at least one moveable wall after crushing the trapped animal.

15. A method according to claim 14, wherein the retracting is performed using a retracting spring.

16. A method according to claim 1, wherein the animal trap further comprises a safety switch which is operable to deactivate the trap when triggered by a user of the animal trap.

17. A method according to claim 1, wherein the control means includes a control valve that is configured to withhold the release of compressed air from a compressed air supply if the pressure of the compressed air is below the limit.

18. A method according to claim 1, wherein the control means includes a control valve that is configured to allow the compressed air to flow to such as to move the at least one moveable wall section if the pressure of the compressed air is above the limit.

* * * * *